Sept. 11, 1973     M. T. ERGENE     3,758,319

METHOD FOR FORMING FOAMED CONCRETE STRUCTURES

Filed Oct. 22, 1970

Inventor
Mehmet T. Ergene

By Peter L. Costas

Attorney

United States Patent Office 3,758,319
Patented Sept. 11, 1973

3,758,319
METHOD FOR FORMING FOAMED CONCRETE STRUCTURES
Mehmet T. Ergene, Hartford, Conn., assignor to The Stanley Works, New Britain, Conn.
Filed Oct. 22, 1970, Ser. No. 83,043
Int. Cl. C04b 21/00
U.S. Cl. 106—88    13 Claims

ABSTRACT OF THE DISCLOSURE

Cellular concrete structures are made by admixing water and cement under conditions sufficient to produce a high degree of hydration of the cement particles, followed by the introduction of a foam formed under pressure from a mixture of water, air, foaming agent and chloride accelerator. The foam mixture and cement admixture are blended to a substantially homogeneous, foamed cement slurry, which is cast into a mold and cured to form a lightweight cellular concrete structure. In the structure, the voids are relatively spherical in shape and have an average diameter of about 0.05 to 0.050 inch. The foaming agent and cure accelerator are concentrated at the surface of the concrete matrix about the voids, and the structure has a uniform density of about 25 to 75 pounds per cubic foot.

BACKGROUND OF THE INVENTION

There are numerous applications in which cellular concrete slabs, pipe and other preformed and poured-in-place structures are used, including walls, panels, footings, etc. for buildings, subgrade and other members for highway construction, portions of boats and ships, burial vaults, fill, etc. One method of producing such cellular concrete structures is by the injection of a preformed foam into a hydrated cement slurry, which thereafter may be cast and cured in a conventional manner. However, in such a process it is difficult to maintain the foam in its expanded state and the bubbles thereof discrete and substantially uniform until the cement matrix sets sufficiently to preserve the desired cellular structure. Moreover, although the setting or curing time for concrete may be decreased considerably by use of accelerators such as chloride salts, such salts have a significant tendency to corrode metal elements associated with the concrete such as reinforcing rods, girders, or the like, in addition to affecting the ultimate properties of the concrete.

Accordingly, it is an object of the present invention to provide a novel process for producing lightweight cellular structures having a concrete matrix with a substantially uniform multiplicity of small voids homogeneously dispersed therethrough.

It is also an object of the invention to provide such a process enabling a desirably slow rate of cure to occur in the bulk of the concrete matrix.

Another object is to provide such a process wherein a relatively low concentration of accelerator is employed, and adverse effects thereof upon the concrete structure or associated metal elements are thereby minimized.

SUMMARY OF THE INVENTION

It has now been found that the foregoing and related objects can be readily attained in a process wherein water and cement are first admixed under conditions sufficient to produce a slurry with a high degree of hydration of the cement particles after which a foam formed under pressure from a mixture of water, air foaming agent and chloride accelerator is introduced thereinto. The cement slurry and foam are blended sufficiently to produce a substantially homogeneous foamed cement slurry which is then cast into a mold and cured to form a lightweight cellular concrete structure with a substantially uniform density of less than about 75 pounds per cubic foot.

Preferably, the process includes the step of incorporating a water-soluble resinous binder into the cement slurry, and the water-soluble binder is desirably a partially hydrolyzed polyvinyl acetate; it is employed in a weight ratio to cement of about 0.0025 to 0.02:1.0. The foaming agent is desirably a proteinaceous material, which may be present in a weight ratio to water of about 0.01–0.04:1.0; and the accelerator desirably comprises an inorganic chloride, which is preferably calcium chloride used in a weight ratio to cement of less than about 0.01:1.0. A fibrous reinforcing agent is particularly desirable in accordance with the present process and may be incorporated in an amount of less than about one pound per cubic foot of foamed slurry.

Most desirably the blending includes a kneading action of the slurry and foam and is limited to a period of less than about 5 minutes to avoid substantial breakdown in bubble formation. After presetting of the cast article, it is desirably cured in an atmosphere of steam for a period of about 3 to 7 days, or it may simply be placed in a mold constructed so as to retard moisture loss. In the preferred process, the resultant cast concrete structure is less than 50 pounds per cubic foot and the average bubble diameter in the cast slurry is about 0.015 to 0.035 inch, to provide a void of about 0.010 to 0.030 inch average diameter.

The cellular concrete structure of the present invention comprises a concrete matrix having substantially homogeneously dispersed therethrough a multiplicity of spherical voids of about 0.005 to 0.050 inch average diameter and relatively narrow size distribution. The concrete matrix comprises cement, foaming agent, and a cure accelerator preferably in a weight ratio to cement of less than about 0.01:1.0. The foaming agent and cure accelerator are concentrated at the surface of the concrete matrix about the voids, and the structure has a uniform density of about 25–75 pounds per cubic foot. Preferably the density is less than 50 pounds per cubic foot and the average diameter of the voids is 0.010 to 0.030 inch.

DETAILED DESCRIPTION OF THE PREFERRED AND ILLUSTRATED EMBODIMENTS

Figure 1:
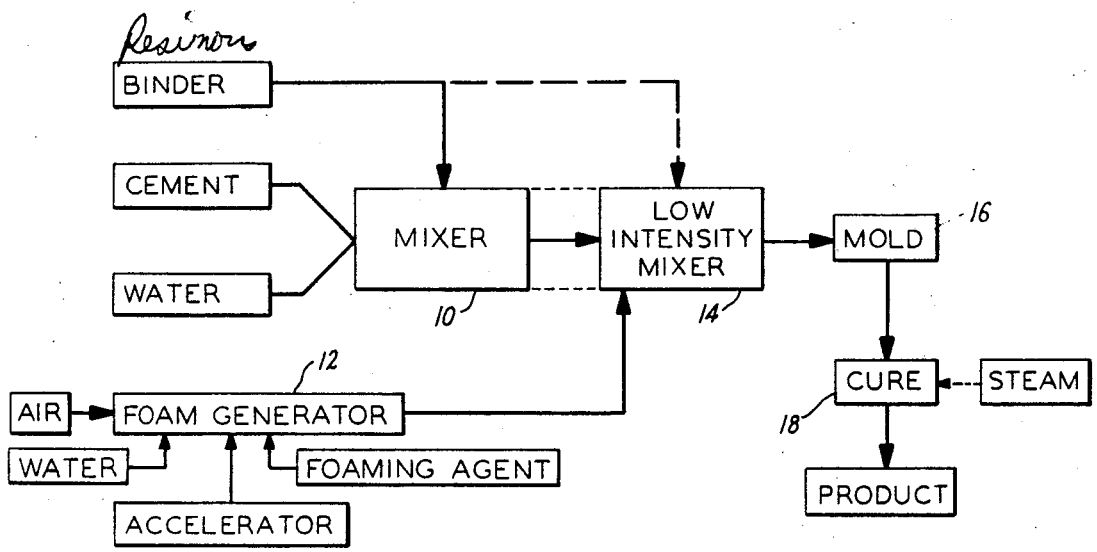
FIG. 1 is a flow diagram diagrammatically illustrating the process of the present invention.

Turning first in detail to FIG. 1 of the appended drawing, the flow diagram represents the process of the present invention, wherein cement and water are first admixed in mixer 10 under conditions sufficient to produce a high degree of hydration of the cement particles. A foam mixture is prepared by admixing air, water, foaming agent and accelerator under pressure in the foam generator 12. This foam mixture is charged into the hydrated cement admixture previously formed in the mixer 10, and is blended therewith in the low intensity mixer 14. The substantally homogeneous foam-containing cement slurry so produced is introduced into the mold 16, and it is thereafter cured at an appropriate station 18 to produce the desired cellular concrete product.

As the dotted lines indicate, the mixers 14 and 10 may be provided as different sections of a single unit or as a single mixer operating at different intensities of agitation. A resinous binder may be introduced into the cement mixture in either one of them (or the two mixing stages), and steam may be used at the curing station 18, if so desired.

Figure 2:
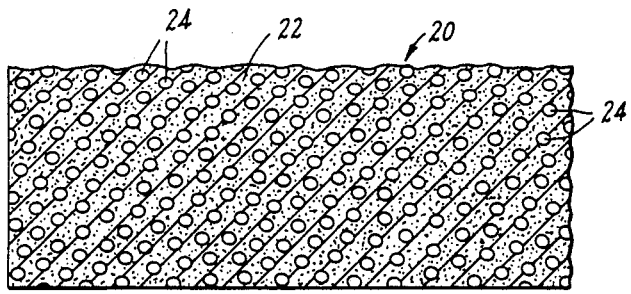
FIG. 2 is a fragmentary sectional view of a cellular concrete structure produced thereby.
Figure 3:
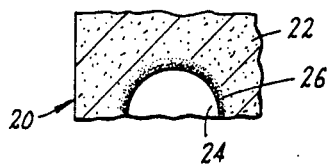
FIG. 3 is a fragmentary sectional view, to a greatly enlarged scale of the structure of FIG. 2.

With particular reference now to FIG. 2, a cellular concrete structure, generally designated by the numeral 20 consists of a concrete matrix 22 having a multiplicity of generally spherical voids 24 homogeneously dispersed therethrough. As is seen in FIG. 3, the surface portion of the concrete matrix about the voids 24 has a thin, diffused layer 26 (shown greatly exaggerated in thickness for purposes of illustration) in which is concentrated the foaming agent and accelerator included in the foam that was used to produce the cellular structure 20.

As has previously been pointed out, the satisfactory practice of the present process requires that the cement and the water be initially mixed so as to produce a high degree of hydration, and this may be accomplished in many different types of conventional mixing equipment such as ribbon, screw, high shear or paddle mixers. However, it is highly preferable to employ a high intensity mixer for the preparation of the cement slurry, since relatively high shear mixing is believed to enhance greatly the degree of water penetration into the cement particles and thereby to provide significantly more complete hydration thereof. For example, use of an Eppenbach homogenizer operating at 3750 r.p.m. has been found to effect increases in hydration of 60–90 percent with concomitant increases in compressive strengths of about 40 to 110 percent. The level of hydration should be at least about 20 percent, based upon the weight of the cement (i.e., the hydrated cement should contain at least about 20 parts of combined water per 100 parts cement therein). This level is referred to as a "high degree of hydration" herein, and preferably the value thereof is in excess of 23 weight percent. Such levels of hydration can be attained by use of a variety of equipment by controlling the intensity and duration of mixing effected therein; however, since use of high shear conditions can produce premature setting as a result of the heat generated by friction within the mass, the conditions of mixing must be closely controlled when high shear is involved. By high intensity mixing, hydration of at least 25 percent may be obtained and is particularly advantageous.

It will be appreciated that any one of a variety of cementitious materials that are subject to accelerated curing by the addition of appropriate agents thereinto may be employed in the present process with some variation in procedure possibly being necessary to obtain optimum result, depending upon the particular cement involved. The use of Type III portland cement results in cellular structures exhibiting high early strength and small cells; however, there is some tendency for excessive shrinkage to occur with this type of cement, and it is relatively expensive. The less expensive and more readily available Type I portland cement, on the other hand, has been found to produce structures substantially equal in strength to those produced with Type III after 28 days of cure, and in which dimensional stability was superior; therefore, the latter is preferred.

The water to cement ratio ($W/C$) is signicant to the attainment of the objects of the invention; broadly, the ratio by weight should be between 0.25–0.60:1.0. The optimum ratio will depend upon the type of cement, the characteristics of the foam and its water content, the properties desired in the produce, etc. When Type I portland cement is employed, the $W/C$ ratio is preferably about 0.3–0.5:1.0, and most desirably it is about 0.425–0.475:1.0. Upon addition of the foam mixture, the cement slurry should have a $W/C$ ratio of 0.5–0.6:1.0 due to the water content of the foam mixture, and best results have been attained with a $W/C$ ratio in the foamed slurry of about 0.56:1.0.

The foam may conveniently be prepared in a foam generator such as that commercially available from Mearl Corporation of Roselle Park, N.J. and sold under the designation No. AT–10–5A. Typically, this type of generator operates by passing air and a solution of water and foaming agent under pressure through a nozzle having an "infinite" surface provided by a large number of small ceramic beads mounted within the nozzle perpendicular to its axis. The nozzle employed will usually be about 20 to 36 inches long, and the longer nozzles have generally been found to produce more desirable foams. Hydrolyzed meat, fish and vegetable proteins are effective foaming agents in this application, and they will normally be used in a ratio to water in the foam mixture of about 0.01–0.04:1.0 and preferably about 0.0125–0.025:1.0. Specific commercially available hydrolyzed proteinaceous materials include National Crete, Elasticzel (both available from the Elasticzel Corporation of America of Alpena, Mich.) and Mearl (sold by the previously identified Mearl Corporation), and other suitable foaming agents that may be used include saponin, peptones, albumin, soap bark, water-soluble cellulose esters, etc. The density of the foam mixture should be about 2.0–7.0 pounds per cubic foot, preferably about 3.0–6.5, and most desirably about 4.5 pounds per cubic foot, under standard conditions of 70° Fahrenheit and 35 percent relative humidity.

When used as described herein, the accelerator is capable of effecting a 25 to 50 percent improvement in ultimate strength, and the preferred accelerator is calcium chloride. This compound has been found not only to be an effective accelerator, but also to provide an additional benefit in enhancing the stability of the foam. A commercially available accelerator formulation which is effectively used in the present process is that which is sold by the Anti Hydro Water Proofing Company of Newark, N.J. under the trademark Anti Hydro; it consists of 25.0 percent by weight of calcium chloride, 74.0 percent of water and 1.0 percent of saponifiable resin. For best results, calcium chloride should be employed in a weight ratio to cement less than about 0.01:1.0 and normally greater than about 0.0035:1.0. This will depend somewhat upon the intended density of the cellular structure, with the ratio of accelerator to cement varying in an inverse relationship. Chlorides other than calcium such as those of the polyvalent metals aluminum, copper, zinc, magnesium, etc., may also be used as the accelerating agent, in which case the molar equivalent to the ratio of calcium chloride hereinabove mentioned will usually be most satisfactory.

After introducing the foam directly into the cement slurry, the admixture is blended in an appropriate manner to produce a homogeneous mixture without causing an undue level of foam collapse, which can be accomplished in a mixer that induces a kneading action. In the event that high intensity mixing is employed in the initial stages of the process to produce the highly hydrated slurry, the intensity of mixing will necessarily be considerably lower for blending of the foam because high intensity agitation would rapidly destroy the foam. On the other hand, if the cement slurry is initially mixed with relatively low intensity agitation, the foam may be blended under the same conditions simply by continuing mixing for a period of time after the injection thereof. The time of additional blending must be selected to produce homogeneity while at the same time avoiding undue foam breakdown; normally, a maximum period of about 5 minutes and a minimum of about 0.5 minute will achieve the desired balance of effects.

The volume of foam injected will depend largely upon the density desired in the ultimate concrete structure and upon that of the foam used. The extreme range for the volumetric ratio of foam to cement slurry will be about 0.9 to 2.75:1.0 to incorporate both relatively high (75 pounds per cubic foot) and relatively low (25 pounds per cubic foot) density portland cement structures.

Subsequent to molding, which may be considered, for purposes of this invention, to include precast and formed-in-place application, the foamed slurry may be vibrated for about 2–4 seconds in the mold, after which it is cured in an appropriate manner, which may be in accord with conventional practice. Preferably, curing is carried out, at least initially, in a mold that minimizes and retards moisture loss so as to ensure the attainment of maximum strength in the structure. Such a mold may be of the so-called "closed type" which is effectively open only at its narrowest dimension. In addition to static molding, the foamed slurry may be cast continuously or semi-continuously onto a relatively movable member provided with suitable configuration to define the configuration for the cast structure desired.

Notwithstanding the advantages of closed mold curing, it is highly beneficial to employ a steam cure technique because the heat provided thereby appears to produce a very significant improvement over structures cured only under conditions of high humidity at ambient temperatures. Typically, steam treatment will commence 8 to 24 hours after an initial preset period for the concrete, and it will desirably continue for a period of about 3 to 7 days in a chamber at temperatures of about 140° to 170° Fahrenheit. Increases in compressive strength after 28 days curing have been noted to be in the range of about 20 to 120 percent for structures subjected to steam treatment for about 40 hours after an initial pre-set period.

In accordance with an especially preferred embodiment of the invention, small amounts of water-soluble or dispersible resinous binders are incorporated in the cement slurry. Although this will be done before injection of the foam, preferably the binder is added before the foam to permit complete mixing of the binder without harm to the cellular structure of the foam. The use of binders produces very significant increases in strength under both compressive and tensile loads, and it also reduces shrinkage and cracking that may otherwise occur in structures of the present type. Typical binders that are suitable for use include polyvinyl acetate and partially hydrolyzed forms thereof, (meth)acrylic acid polymers, polyvinyl pyrrolidine, polystyrene, polyethylene, polyvinyl chloride and vinylidene chloride homopolymers and copolymers, styrene/butadiene copolymers, grafts of resins onto rubbers such as ABS and impact polystyrene, etc. Especially good results have been obtained by use of partially hydrolyzed polyvinyl acetates, such as that sold by the Borden Chemical Company under the trademark Polvco 21119 and containing 50 percent by weight solids. For example, it has been found that this binder produces significant improvements when employed in amounts of about 0.5 to 3.5 percent based upon the weight of the cement used. On a solids basis, the binders are desirably used in ratios to the weight of cement of about 0.0025–0.02:1.0, preferably about 0.005–0.015:1.0 and most desirably at a ratio of about 0.01:1.0.

In addition to synthetic resin binders, various fillers may be included in the cement mixture including flyash, sand and other common aggregates of different types. Furthermore, fibrous materials may be added to the cement to enhance its "green" strength and also to improve the tensile strength of the final concrete structure: normally less than about one pound per cubic foot of concrete is appropriate for a good balance of properties. Exemplary of the fibrous materials that may be added are coated glass, ceramics, glass/ceramics, asbestos or other mineral fibers, fine metallic wires, synthetic fibers such as nylon, rayon, polyesters, etc. Moreover, metal lathings, woven and nonwoven fibrous webs, and other types of reinforcing networks may be included in the concrete structure if so desired.

An important aspect of the present invention is that it enables the production of spherical bubbles of relatively narrow size distribution in the foamed concrete slurry and voids of controlled diameter and relatively narrow distribution in the resultant concrete structure. Collapse of the bubbles and excessive reduction in the size of the voids in the concrete structure from the size of the bubbles in the foamed slurry is substantially prevented by the stability of the bubble achieved in the present invention and the rapid setting of the concrete thereabout.

In accordance with the present invention, the bubbles in the foamed slurry have an average diameter of 0.005–0.060 inch, and preferably about 0.010–0.035 inch. The voids in the cast concrete structure will similarly have an average diameter of 0.005–0.050 inch, and preferably about 0.010–0.035 inch. Some reduction in size will normally occur with respect to the larger size bubbles, but the average diameter will be reduced by less than 50 percent, and most usually less than 20 percent.

Exemplary of the present invention are the following specific examples, wherein all parts specified are on a weight basis, unless otherwise indicated.

Example 1

Into a paddle mixer having a 10 cubic foot capacity are charged 188 pounds of Type I portland cement (sold by Penn Dixie Company), 83 pounds of tap water and about 6 pounds of a water-soluble partially hydrolyzed polyvinylacetate resin (Polyco 2119) and the charges are admixed at 35 r.p.m. for a period of about 15 minutes to produce a hydrated cement slurry. A foam having a density of about 4.37 pounds per cubic foot is produced in a Mearl No. AT–10–5A foam generator fitted with a 36 inch long nozzle, from 73.4 percent water, 25.45 percent Anti Hydro accelerating agent, and 1.14 percent of National Crete fish protein foaming agent, and the foam is injected directly into the hydrated cement slurry in the mixer. About 16.5 pounds (38 cubic feet) of foam is injected over a period of between one and two minutes, and the mixer is operative during the entire injection period and for about an additional minute after all of the foam has been added.

The resultant slurry, having a density of about 39 pounds per cubic foot, is then poured into cylindrical molds to produce three castings, each eight inches long and four inches in diameter. The castings are allowed to preset in the molds for about 24 hours, after which they are steam cured in a chamber at a temperature of about 150° Fahrenheit for seven days.

Upon evaluation, the cured cellular concrete structures that result are found to have an average density of about 33.5 pounds per cubic foot and an average compressive strength under an axially applied load, of about 320 pounds per square foot. The voids therein are uniform in size and have an average diameter of about 0.025 inch.

Example 2

The procedure of Example 1 is substantially repeated but utilizing 282 pounds of cement, 120 pounds of water and about 6.3 pounds of polyvinyl acetate resin. The admixture is agitated under the conditions specified for a period of about 20 minutes, and 28 pounds (6.3 cubic feet) of foam is injected during a period of two to three minutes. The density of the resultant slurry is about 44.5 pounds per cubic foot and the evaluated cylindrical castings are found to have an average density of 45.5 pounds per cubic foot, an average compressive strength of about 610 pounds per square inch, and to have uniform voids of about 0.030 inch average diameter.

Example 3

The procedure of Example 1 is again repeated, utilizing the proportions of slurry components and mixing conditions specified in Example 2. However, in the present example the density of the foam is about 4.3 pounds per cubic foot, the amount thereof is 39.2 pounds (9.1 cubic feet), is injected over a period in excess of three minutes. The density of the resultant slurry is about 33 pounds per cubic foot and the evaluated castings are found to have an average value of density and compressive strength of 28 pounds per cubic foot and 260 pounds per square inch respectively, and the voids therein are of narrow particle size distribution with an average diameter of about 0.035 inch.

Example 4

The procedure of Example 1 is once again repeated using the same materials and amounts thereof as are employed therein, substantially the only difference being the use of an Eppenbach homogenizer operating at 3750 r.p.m. for a period of about five minutes to effect the initial hydration of the cement particles. The cylindrical castings produced therefrom are found to exhibit compressive strengths more than 40 percent higher than those exhibited by the castings produced in Example 1.

Although the theory of the present invention is not fully understood, it is believed that the introduction of the accelerator as a component of the foam causes it to become concentrated at the surface of the matrix defining the voids of the cellular structure. As a result, the accelerator increases the rate of cure of the cement about the voids and thereby greatly diminishes the possibility of bubble collapse before the cell structure has become established. Concentration of the accelerator in such a way also has the advantage of permitting the bulk of the matrix to cure at a desirably slower rate and it minimizes the amount of accelerator dispersed in the matrix and hence the overall corrosive effect thereof. Due to the pattern of accelerator distribution achieved, the total amount thereof is minimized (i.e., it is preferably used in ratio to cement of less than 0.01:1.0 whereas normally the ratio is at least 0.01:1.0 or higher), and the presence of the accelerator in the foam appears also to have a stabilizing effect thereon.

Thus it can be seen that the present invention provides a novel process for the production of light-weight, cellular concrete structures having a concrete matrix with a multiplicity of small, uniform voids homogeneously dispersed therethrough. The process enables a desirably slow rate of cure to occur in the bulk of the concrete matrix, and since a relatively low concentration of accelerator is employed, the adverse effects thereof upon the concrete structure are minimized. The invention also provides a novel cellular structure comprising a concrete matrix having a multiplicity of small, uniform voids homogeneously dispersed therethrough, and having a desirably low concentration of accelerator therein dispersed in a beneficial manner at the surfaces of the concrete matrix about the voids.

What is claimed is:

1. In a process for making lightweight cellular concrete structures, the steps comprising:
    (a) admixing water and cement under conditions sufficient to produce a high degree of hydration of the cement particles;
    (b) introducing into the hydrated cement admixture a foam formed under pressure from a mixture of water, air foaming agent and a chloride accelerator in a weight ratio to cement of 0.0035 to 0.01:1.0;
    (c) blending said cement admixture and said foam mixture sufficiently to produce a substantially homogeneous foamed cement slurry;
    (d) casting said cement slurry into a mold; and
    (e) curing said cement slurry to form a lightweight cellular concrete structure comprising a concrete matrix having substantially homogeneously dispersed therethrough a multiplicity of spherical voids of about 0.005 to 0.050 inch average diameter and of relatively narrow size distribution, said concrete structure having a substantially uniform density of less than about 75 pounds per cubic foot, said chloride accelerator being concentrated at the surfaces of the concrete matrix about the voids.

2. The process of claim 1 including the step of incorporating a water-soluble resinous binder in said hydrated cement admixture.

3. The process of claim 2 wherein said binder is a partially hydrolyzed polyvinyl acetate.

4. The process of claim 2 wherein said binder is incorporated in a weight ratio to cement of about 0.0025–0.02:1.0.

5. The process of claim 1 wherein said foaming agent is a proteinaceous material.

6. The process of claim 1 wherein said foaming agent is introduced in a weight ratio to water of about 0.1–0.04:1.0.

7. The process of claim 1 wherein said chloride accelerator comprises calcium chloride.

8. The process of claim 6 wherein the density of the cast concrete structure is less than 50 pounds per cubic foot and wherein the average bubble size in said slurry is about 0.010–0.035 inch.

9. The process of claim 1 wherein there is included the step of incorporating into said slurry less than about one pound per cubic foot thereof of a fibrous reinforcing agent.

10. The process of claim 1 wherein said blending includes a kneading action of said slurry and is limited to a period of less than about five minutes to avoid substantial breakdown of the bubbles therein.

11. The process of claim 1 wherein said foamed cement slurry has an average bubble size of about 0.005–0.060 inch diameter.

12. The process of claim 1 wherein said cast slurry in said mold is cured in an atmosphere of steam for a period of 3–7 days.

13. The process of claim 1 wherein said mold into which said slurry is cast is one constructed to retard moisture loss.

References Cited

UNITED STATES PATENTS

| | | | |
|---|---|---|---|
| 3,522,069 | 7/1970 | Checko et al. | 106—88 |
| 3,144,346 | 8/1964 | Dilnot | 106—88 |
| 2,915,301 | 12/1959 | Selden | 106—88 |
| 3,615,784 | 10/1971 | Cattanach | 106—88 |

JAMES E. POER, Primary Examiner

U.S. Cl. X.R.

106—90, 91, 97, 99